US007060342B2

(12) United States Patent
Moriya et al.

(10) Patent No.: US 7,060,342 B2
(45) Date of Patent: *Jun. 13, 2006

(54) RECORDING MEDIUM AND IMAGE-FORMING METHOD EMPLOYING THE SAME

(75) Inventors: Kenichi Moriya, Tokyo (JP); Mamoru Sakaki, Yamato (JP); Kazuo Iwata, Yokohama (JP); Akio Kashiwazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/870,590

(22) Filed: Jun. 1, 2001

(65) Prior Publication Data

US 2002/0008750 A1 Jan. 24, 2002

Related U.S. Application Data

(60) Division of application No. 08/923,990, filed on Sep. 5, 1997, now Pat. No. 6,244,701, which is a continuation of application No. 08/518,171, filed on Aug. 23, 1995, now abandoned.

(30) Foreign Application Priority Data

Aug. 25, 1994 (JP) .................................. 6-200576
Jun. 14, 1995 (JP) .................................. 7-147456

(51) Int. Cl.
*B32B 3/00* (2006.01)
*B41M 5/00* (2006.01)

(52) U.S. Cl. ........................ 428/172; 283/91; 283/109; 428/195.1

(58) Field of Classification Search ................ 428/195, 428/457, 195.1, 32.19, 32.1
See application file for complete search history.

(56) References Cited

U.S. PATENT DOCUMENTS

| | | | | |
|---|---|---|---|---|
| 4,478,910 | A | 10/1984 | Oshima et al. | 428/331 |
| 4,550,053 | A | 10/1985 | Arai et al. | 428/304.4 |
| 4,636,805 | A | 1/1987 | Toganoh et al. | 346/1.1 |
| 4,664,952 | A | 5/1987 | Arai et al. | 427/256 |
| 4,686,118 | A | 8/1987 | Arai et al. | 427/261 |
| 4,723,129 | A | 2/1988 | Endo et al. | 346/1.1 |
| 4,740,796 | A | 4/1988 | Endo et al. | 346/1.1 |
| 4,785,313 | A | 11/1988 | Higuma et al. | 346/135.1 |
| 4,832,984 | A | 5/1989 | Hasegawa et al. | 427/161 |
| 4,849,774 | A | 7/1989 | Endo et al. | 346/140 R |
| 4,877,680 | A | 10/1989 | Sakaki et al. | 428/332 |
| 4,919,994 | A | 4/1990 | Incremona et al. | 428/141 |

(Continued)

FOREIGN PATENT DOCUMENTS

DE 3410854 9/1984

(Continued)

OTHER PUBLICATIONS

Patent Abstracts of Japan, vol. 18, No. 335, Jun. 24, 1994, p. 84 M 1627, with respect to JP-A-06-079 967.

(Continued)

*Primary Examiner*—Pamela R. Schwartz
(74) *Attorney, Agent, or Firm*—Fitzpatrick, Cella, Harper & Scinto

(57) ABSTRACT

Provided is a recording medium comprising an ink-receiving layer provided on at least one face of a base material, wherein a surface of the ink-receiving has the maximum specular glossiness within a measurement angle range of from 20° to 60°.

10 Claims, 6 Drawing Sheets

U.S. PATENT DOCUMENTS

| | | | | |
|---|---|---|---|---|
| 4,956,223 | A | 9/1990 | Arai et al. | 428/212 |
| 4,960,638 | A | 10/1990 | Mukoyoshi et al. | 428/342 |
| 5,122,814 | A | 6/1992 | Endo et al. | 346/33 R |
| 5,159,349 | A | 10/1992 | Endo et al. | 346/33 A |
| 5,284,689 | A | 2/1994 | Laurash et al. | 421/195 |
| 5,492,370 | A * | 2/1996 | Chatwin et al. | 283/110 |
| 5,506,016 | A | 4/1996 | Onodera et al. | 428/40 |
| 5,532,115 | A | 7/1996 | Bodager et al. | 430/325 |
| 5,766,398 | A * | 6/1998 | Cahill et al. | |
| 6,244,701 | B1 * | 6/2001 | Moriya et al. | 347/105 |

FOREIGN PATENT DOCUMENTS

| | | |
|---|---|---|
| EP | 0 500021 | 8/1992 |
| JP | 54-59936 | 5/1979 |
| JP | 355150370 A * | 11/1980 |
| JP | 60-220750 | 11/1985 |
| JP | 63-265680 | 11/1988 |
| JP | 3-26665 | 4/1991 |
| JP | 5-36237 | 5/1993 |

OTHER PUBLICATIONS

Patent Abstracts of Japan, vol. 14, No. 469, Oct. 12, 1990, p. 50 M 1034, with respect to JP-A-63-265-680.

Patent Abstracts of Japan, vol. 13, No. 60, Feb. 10, 1989, p. 131 M 796; JP-A-63 265 680.

* cited by examiner

RECORDING MEDIUM AND IMAGE-FORMING METHOD EMPLOYING THE SAME

This is a divisional application of application Ser. No. 08/923,990, filed Sep. 5, 1997, now U.S. Pat. 6,244,701 which is a continuation of application Ser. No. 08/518,171, filed Aug. 23, 1995, now abandoned.

BACKGROUND OF THE INVENTION

1. Field of the Invention

The present invention relates to a recording medium having high gloss including metallic luster, an image-forming method employing the recording medium, and a printed matter obtained by the image-forming method.

2. Related Background Art

Ink-jet recording is a recording method which conducts recording through steps of forming ink droplets, ejecting the ink droplets, and depositing a part or the whole of the ejected ink onto a recording medium such as a paper sheet or a plastic film coated with an ink-receiving layer. The above ink droplets are formed by various methods such as electrostatic attraction, mechanical vibration or displacement by a piezo-electric element, pressure application by bubbling of ink by heating. The ink-jet recording method is attracting attention because of less noise generation, and capability of high speed printing and multi-color printing.

The ink for ink-jet recording system is mainly composed of water in view of safety, and recording characteristics. Frequently, a polyhydric alcohol is added to the ink to prevent clogging in a nozzle, and to improve ejection stability.

The recording medium for the ink-jet recording includes various kinds of paper sheets, OHP films, glossy paper sheets, glossy films, cloth, etc. The method of feeding of the recording medium has developed, and automatic sheet feeding is mainly employed in place of manual sheet feeding.

The recording mediums conventionally employed include recording sheets for an overhead projector (hereinafter referred to as "OHP") constituted of a polyester film having thereon a hydrophilic film composed of polyvinyl alcohol of saponification degree of 70 mole percent to 90 mole percent as disclosed in Japanese Patent Application Laid-Open No. 60-220750; recording paper sheets constituted of a base paper sheet having a coating layer containing fine powdery silica and water-soluble binder like polyvinyl alcohol as disclosed in Japanese Patent Publication No. 3-26665; glossy paper sheets constituted of an opaque base material like synthetic paper and having thereon a film mainly composed of a water-soluble resin; and so forth. Further, a cast-coated paper sheet for ink-jet recording having a coat layer formed by casting and mainly composed of silica and a binder is disclosed in Japanese Patent Application Laid-Open No. 63-265680.

As the results of improvements in performance of ink-jet recording apparatus such as a higher printing rate, and multi-color printing, more improvements are required for the ink-jet recording medium. The required properties for the ink-jet recording medium include: (1) higher ink absorbency (larger absorption capacity, and shorter absorption time); (2) capability of giving higher optical density of the printed ink dots without blurring at the dot periphery; (3) capability of giving nearly completely circular dots with smoothness of the dot periphery; (4) less change of properties caused by change of temperature and humidity without causing curling of the recording medium; (5) no occurrence of blocking; (6) capability of maintaining printed images stably for a long term (especially under high temperature and high humidity); and (7) stability of the recording medium itself over a long term without deterioration (especially under high temperature and high humidity). Various recording mediums are demanded with the increase of the printing speed, increase of the image density, development of color printing, and diversification of ink.

The ink-jet recording sheet disclosed in Japanese Patent Publication No. 3-26665 has a mat-like surface appearance without gloss. The glossy paper sheet disclosed in Japanese Patent Publication No. 5-36237 does not exhibit sufficient gloss at non-printed portions although it allows image formation with high gloss and high density in comparison with conventional paper.

Conventional recording mediums have had a specular gloss which tends to increase gradually with increase in specular glossiness when measuring it continuously with an angle of from 20° to 75°, and to reach the maximum at 75°. Therefore, the conventional recording mediums are not satisfactory in dynamic representation of color owing to poor contrast of gloss at a non-printed area, and sufficient gloss of the recording medium can be perceived only when the medium is viewed at an oblique angle since the specular glossiness has reached the maximum at 75°.

Conventional printed matters have had a specular gloss which tends to increase gradually with increase in specular glossiness when measuring it continuously with an angle of from 20° to 75°, and to reach the maximum at 75°. Therefore, the conventional printed matters are not satisfactory in dynamic representation of color owing to poor contrast of gloss at a non-printed area, and sufficient gloss of the printed matters can be perceived only when the medium is viewed at an oblique angle since the specular glossiness has reached the maximum at 75°.

SUMMARY OF THE INVENTION

An object of the present invention is to provide a recording medium which has sufficient gloss for decorativeness and is capable of giving dynamic color representation.

Another object of the present invention is to provide a printed matter of yellow, magenta, and cyan colors which has sufficient gloss for decorativeness and is capable of giving dynamic color representation.

A further object of the present invention is to provide an ink-jet recording medium having metallic luster, to provide a printed matter having metallic luster, and to provide a process for production thereof.

According to the present invention, there is provided a recording medium comprising an ink-receiving layer provided on at least one face of a base material, wherein a surface of receiving layer has the maximum specular glossiness within a measurement angle range of from 20° to 60°.

According to the present invention, there is also provided a printed matter printed with ink dots on a recording medium comprising an ink-receiving layer provided on at least one face of a base material, and at least one of solid printed areas of yellow, magenta, and cyan colors has the maximum specular glossiness within a measurement angle range of from 20° to 60°.

According to the present invention, there is further provided a recording medium comprising a metal foil, an ink-intercepting layer formed at least one face of the metal foil, and an ink-receiving layer formed on the ink-intercepting layer.

According to the present invention, there is still provided a recording medium comprising a film having an ink-intercepting effect, vapor-deposited metal on one face of the film, and an ink-receiving layer provided on the reverse face of the film.

According to the present invention, there is still further provided an image-forming method which forms an image by ink-jet recording system on the aforementioned recording medium.

According to the present invention, there is also still provided a process for the production of printed matter comprising forming a printed matter having metallic luster by ink-jet recording system on the aforementioned recording medium.

DETAILED DESCRIPTION OF THE PREFERRED EMBODIMENTS

Figure 1:
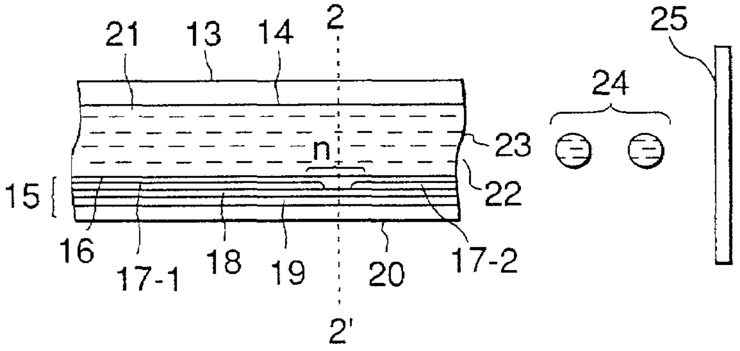
FIG. 1 is a longitudinal cross-sectional view of a recording head of an ink-jet recording apparatus.

It has been found by the inventors of the present invention, during their development work for a recording medium for ink-jet recording system, that the aforementioned printed matter has excellent decorativeness and achieves dynamic color saturation and hue expression, and the present invention has been completed based on the above findings.

The printed matter having excellent decorativeness and dynamic color saturation and hue expression herein means the one which has a base material, and an ink-receiving layer formed on at least one face of the base material, where a solid printed area of at least one of yellow, magenta, and cyan colors of the print has the maximum specular glossiness within a measurement angle range of from 20° to 60°, and the specular glossiness exceeds 100% at a measurement angle ranging from 20° to 75°.

In a case that the maximum specular glossiness can be obtained at an incident light angle of 60° or more, it cannot be observed visually unless it is viewed at an oblique angle. Also, in a case that the specular glossiness is lower than 100% throughout the all measurement angle, the glossiness is felt to be insufficient as a whole similarly as conventional glossy paper sheets. Furthermore, the recording medium is observed usually at a right angle rather than at an oblique angle.

The above-mentioned printed matter of the present invention has sufficient glossiness and excellent decorativeness, and capable of expressing dynamic color saturation and hues.

The present invention is described below in more detail by reference to preferred embodiments.

The base material employed in the present invention may be any material, provided that the recording medium or the printed matter has the above physical properties. The material includes paper such as pure paper, medium-quality paper, art paper, bond paper, regenerated paper, baryta paper, cast-coated paper, and corrugated fiberboard paper; films of plastics such as polyethylene terephthalate, cellulose diacetate, cellulose triacetate, cellophane, celluloid, polycarbonates, polyimides, polyvinyl chlorides, polyvinylidene chlorides, polyacrylates, polyethylenes, and polypropylenes; wood boards; glass plates; cloth made from materials such as cotton, rayon, acrylics, silk, and polyester fiber, and so forth. The surface of the base material may be smooth or rough, or transparent, translucent, or opaque. The base material may be a lamination of the two or more of the above mentioned materials. Naturally, the base material is not limited to the above materials.

The base material may have a metal film on the one or both faces thereof, or a mat layer, releasable adhesive layer, or the like on the face reverse to the printing face, or may be provided with an adhesive layer on the printed face after printing.

The metal film may be a foil of gold, silver, copper, aluminium, or the like, or a vapor deposition film of the above metal.

An ink-receiving layer is preferably formed on the metal film with interposition of an ink-intercepting layer in order to maintain the metallic luster stably and perpetually for a long time. Without the ink-intercepting layer, water or a dye contained in the ink tends to react with the metal such as aluminium, or copper during a long term of storage of the printed matter to cause loss of metallic luster, or corrosion of the metal foil.

Any of the metal face, the ink-intercepting layer, and the ink-receiving layer may be colored. For example, when aluminium foil is used, the ink-intercepting layer may be colored yellow to obtain a golden recording medium, or may be colored reddish brown to obtain a copper-colored recording medium.

If the ink-intercepting layer is colored, the coloration is preferably made to be highly transparent so as not to impair the metallic luster. The coloration may be conducted in any method. Generally, it is preferably colored with a dye.

The material for the ink-intercepting layer includes films of plastics such as polyethylene terephthalate, cellulose diacetate, cellulose triacetate, cellophane, celluloid, polycarbonates, polyimides, polyvinyl chlorides, polyvinylidene chlorides, polyacrylates, polyethylenes, and polypropylenes; glass plates; and the like.

The metal film has preferably a thickness ranging from 1 Å to 20 μm. With the thickness of less than 1 Å, the metallic luster characteristic of the metal is not obtainable. With the thickness of more than 20 μm, the effect of the thickness is not obtainable.

Without using the metal film, the recording medium of the present invention can be obtained by incorporating a powdery metal into the ink-receiving layer, by providing at least one powdery metal-containing layer between the ink-receiving layer and the base material or on the face reverse to the ink-receiving layer, or by a like method.

The aforementioned powdery metal includes powder of metals such as gold, silver, copper, brass, aluminium, titanium, magnesium, beryllium, platinum, nickel, cobalt, chromium, palladium, and zinc; oxidation products thereof; alloys thereof, but is not limited thereto. A metal film having been separately formed and cut finely may be used in place of the powdery metal.

The base material having the metal film may be fabricated as mentioned above, provided that the objects of the present invention can be achieved.

Further in the present invention, by forming a fine rugged pattern on the surface of the base material or the ink-receiving layer an interference of the reflected light is caused and then an image brightened as rainbow can be produced.

Embossing the base material having convexities and concavities mentioned above can make also an image brightened as rainbow three-dimensional.

The base material of the recording medium is selected from the above materials depending on the purpose of the recording, the use of the printed image, adhesiveness to the composition applied thereon, and other conditions.

The material for the ink-receiving layer is not specially limited, and is not limited to those having solubility in or affinity to the aqueous ink, or ink acceptability. The material includes synthetic resins such as polyvinylpyrrolidones, polyvinyl alcohols, anion-modified polyvinyl alcohols, cation-modified polyvinyl alcohols, polyurethanes, carboxymethylcelluloses, polyesters, polyacrylic acids (and esters thereof), hydroxyethylcelluloses, cation modified hydroxyethylcelluloses, melamine resins, and modified materials thereof; and natural resins such as albumin, gelatin, casein, starch, cationic starch, gum arabic, and sodium alginate, but is not limited thereto. These materials may be used alone or in combination of two or more thereof.

Further, the ink-receiving layer may be made from a water-dispersible resin, including polyvinyl acetates, ethylene-vinyl acetate copolymers, polystyrenes, styrene-(meth) acrylate ester copolymers, vinyl acetate-(meth)acrylate copolymers, poly(meth)acrylamides, (meth)acrylamide type copolymers, styrene-isoprene copolymers, styrene-butadiene copolymers, ethylene-propylene copolymers, polyvinyl ethers, and the like, but the material is not limited thereto. Such water-soluble resins and the water-dispersible resins may be used in combination of two or more thereof.

Among these materials, polyvinyl alcohols, cation-modified polyvinyl alcohols, acetal-modified polyvinyl alcohols, hydroxyethylcelluloses and polyvinylpyrrolidones are preferred in particular from the viewpoints of excellent transparencies of an ink-receiving layer and printed portions.

In order to prevent image-bleeding with time of the ink-receiving layer, a cationic compound may be incorporated thereto. The cationic compound may be any compound which has a cationic moiety in the molecule.

The cationic compound includes monoalkylammonium chloride, dialkylammonium chloride, tetramethylammonium chloride, trimethylphenylammonium chloride; quaternary ammonium type cationic surfactants such as ethylene oxide-added ammonium chloride; amine salt type cationic surfactants; and ampholytic surfactants of alkylbetaine type, imidazolynium betaine type, and alanine type.

The cationic compound further includes polymers and oligomers such as cation-modified polyacrylamide, copolymers of acrylamide with a cationic monomer, polyallylamine, polyamine sulfone, polyvinylamine, polyethylenimine, polyamide-epichlorohydrin resins, polyvinylpyridinium halide, and the like.

The cationic compound further includes homopolymers of vinylpyrrolidone type monomers and copolymers thereof with a usual monomer; homopolymers of vinyloxazolidone type monomers and copolymers thereof with a usual monomer; and homopolymers of vinylimidazole type monomers and copolymers thereof with a usual monomer. The aforementioned usual monomer includes methacrylates, acrylates, acrylonitrile, vinyl ethers, vinyl acetate, ethylene, styrene, and the like.

The above cationic compounds may be used alone or in combination of two or more thereof, or a low molecular cationic compound and a high molecular cationic compound may be used combinedly. In the present invention, the above cationic compound is not essential, but plays a supplemental role.

The ink-receiving layer may further contain a crosslinking agent such as methylolated melamine, methylolated urea, methylolated hydroxypropylene urea, isocyanates, and the like.

To obtain a suitable surface smoothness of the ink-receiving layer, a filler or additives may be used in such an amount that the object of the present invention is not hindered. The filler includes silica, alumina, aluminum silicate, calcium silicate, magnesium silicate, basic magnesium carbonate, talc, clay, mica, hydrotalcite, calcium carbonate, barium carbonate, titanium oxide, zinc oxide, plastic pigments such as polyethylene, polystyrene, and polyacrylate, and glass beads, but is not limited thereto.

The additives include surfactants, dye-fixing agents (water-proofing agents), antifoaming agents, antioxidants, fluorescent brighteners, UV-absorbing agents, dispersants, viscosity-controlling agents, pH-controlling agents, mildew-proofing agents, and plasticizers. These additives are selected from known conventional compounds to meet the objects.

The ink-receiving layer of the recording medium or the printed matter of the present invention is prepared as below. The mixture of the aforementioned components, optionally with other additives, is dissolved or dispersed in water, an alcohol, a polyhydric alcohol, or another suitable organic solvent to prepare a coating liquid. The resulting coating liquid is applied onto the surface of the base material by roll coating, blade coating, air knife coating, gate roll coating, bar coating, size press coating, spray coating, gravure coating, curtain coating, or the like method. Then the applied matter is dried by a hot air dryer, hot drum, or the like dryer to obtain a recording medium of the present invention.

An amount of the coating liquid to form the ink-receiving layer is in a total amount ranging from 0.2 to 50 g/m$^2$, preferably from 1 to 30 g/m$^2$ in a dry base. Portions of the base material may be uncoated when the coating amount is small. However, with the coating amount of less than 0.2 g/m$^2$, the intended effects of the coating in coloring property is insufficient, whereas with the coating amount of more than 50 g/m$^2$, the recording medium will curl remarkably, in particular, under low temperature and low humidity environment. The amount of coating in terms of thickness is preferably in the range of from 0.5 to 100 μm.

Any known ink may be used for the ink-jet recording system on the recording medium of the present invention described above. The recording agent for the ink includes water-soluble dyes exemplified by direct dyes, acid dyes, basic dyes, reactive dyes, and food colors, disperse dyes, and pigments. Any conventional ink-jet recording ink is useful without limitation. A conventional ink contains the water-soluble dye, disperse dye, or the pigment at a content ranging from about 0.1% to 20% by weight. This range of the content is satisfactory in the ink used in the present invention.

The solvent for the aqueous ink employed in the present invention is water, or preferably a mixture of water with a water-soluble organic solvent. The water-soluble organic solvent is preferably a polyhydric alcohol exhibiting the effect of prevention of ink drying.

The printing with the above-described ink on the above-described recording medium is conducted preferably by an ink-jet recording system. Any type of ink-jet recording system is useful which ejects ink through a nozzle effectively onto a recording medium. In particular, the ink-jet system, disclosed in Japanese Patent Application Laid-Open No. 54-59936, is effectively employed which ejects ink through a nozzle by action of abrupt volume change of the ink caused by thermal energy.

Figure 2:
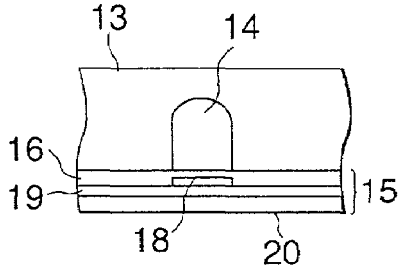
FIG. 2 is a lateral cross-sectional view of a recording head of an ink-jet recording apparatus.
Figure 3:
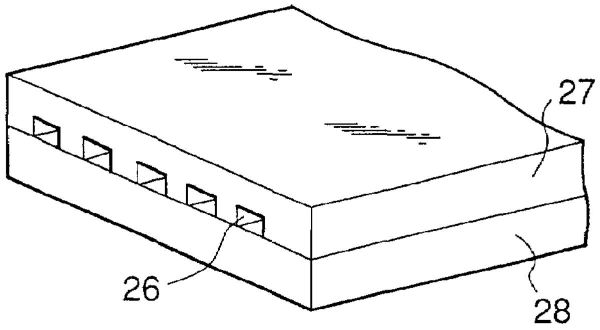
FIG. 3 is a perspective view of a recording head constructed by multiplication of the recording head shown in FIG. 1.

An example of the ink-jet recording apparatus which is suitable for ink-jet recording system of the present invention is explained by reference to the drawings. FIGS. 1, 2, and 3 illustrates an example of the construction of a head which is the essential part of the apparatus.

In these drawings, a head 13 is constructed by bonding a plate of glass, ceramics, or plastics having grooves 14 for ink flow with a heat-generating head 15 for thermal recording. (The heat-generating head is not limited to the thin film head shown in the drawings.) The heat-generating head 15 is constituted of a protection layer 16 formed from silicon oxide or the like; aluminum electrodes 17-1, 17-2; a heat-generating resistance layer 18 made of nichrome or the like; a heat-accumulating layer 19; and a heat-radiating substrate plate 20 made of alumina or the like.

The ink 21 fills an ejection orifice (fine nozzle) 22, and has a meniscus 23 formed by a pressure P.

On application of an electric signal information to the electrodes 17-1, 17-2 of the head, the region denoted by a symbol "n" on the heat-generating head 15 generates heat abruptly to form bubbles in the ink 21 on that region, the pressure of the bubble pushes out the meniscus 23 to eject the ink 21 from the orifice 22 in a shape of droplets 24. The ejected ink droplets travel toward a recording medium 25.

FIG. 3 shows an external appearance of a multiple head integrating a plurality of heads shown in FIG. 1. The multiple head is formed by bonding a glass plate 27 having multiple grooves 26 with the heat-generating head 28 like the one shown in FIG. 1. FIG. 1 is a cross-sectional view of the head 13 along the ink flow path. FIG. 2 is a cross-sectional view along the line 2–2' in FIG. 1.

Figure 4:
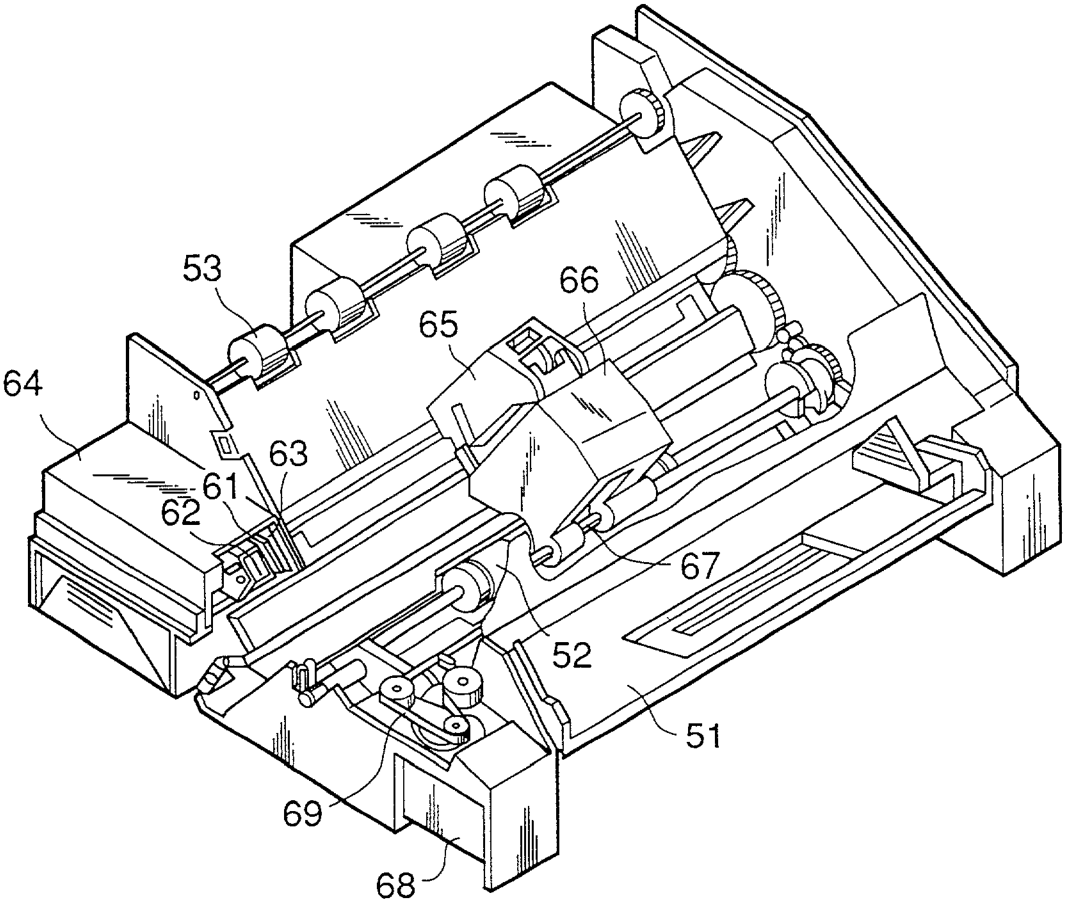
FIG. 4 is a perspective view of an ink-jet recording apparatus.

FIG. 4 shows an example of the entire ink-jet recording apparatus equipped with the above-described head. In FIG. 4, a blade 61 as a wiping member is held at one end of the blade by a blade-holding member, forming a fixed end in a shape of a cantilever. The blade 61 is placed at a position adjacent to the recording region of the recording head, and, in this example, is held so as to protrude to the moving path of the recording head. The cap 62 is placed at a home position adjacent to the blade 61, and is constituted such that it moves in the direction perpendicular to the moving direction of the recording head to come into contact with the ejection nozzle face to cap the nozzle. An ink absorbent 63 is placed at a position adjacent to the blade 61, and is held so as to protrude to the moving path of the recording head in a manner similar to that of the blade 61. The blade 61, the cap 62, and the absorbent 63 constitute an ejection recovery device 64. The blade 61, and the absorbent 63 serve to remove water, dust, etc. from the face of the ink ejection nozzle.

A recording head 65 has an energy-generating means for the ejection, and conducts recording by ejecting the ink onto a recording medium opposing to the ejection nozzle face. A carriage 66 is provided for supporting and moving the recording head 65. The carriage 66 is engaged slidably with a guide rod 67. A portion of the carriage 66 is connected (not shown in the drawing) to a belt 69 driven by a motor 68, so that the carriage 66 is movable along the guide rod 67 to the recording region of the recording head 65 and the adjacent region thereto.

A paper delivery device 51 for delivery of a recording medium and a paper delivery roller 52 driven by a motor (not shown in the drawing) delivers a recording medium to the position facing to the ejection nozzle face of the recording head, and the recording medium is delivered with the progress of the recording to a paper discharge device provided with paper-discharging rollers 53.

In the above constitution, when the recording head 65 returns to the home position on completion of recording, the cap 62 of the ejection-recovery device 64 is positioned out of the moving path of the recording head 65, and the blade 61 is allowed to protrude to the moving path. Thereby, the ejecting nozzle face of the recording head 65 is wiped. To cap the ejection face of the recording head 65, the cap 62 protrudes toward the moving path of the recording head to come into contact with the ejection nozzle face.

When the recording head 65 is made to move from the home position to the record-starting position, the cap 62 and the blade 61 are at the same position as in the above-mentioned wiping step, so that the ejection nozzle face of the recording head 65 is wiped also in this movement.

The recording head is moved to the home position not only at the completion of the recording and at the time of ejection recovery, but is also moved at predetermined intervals during recording from the recording region. The nozzle is wiped by such movement.

The present invention is described in more detail by reference to examples. In the examples, the terms "part" and "%" are based on weight unless otherwise mentioned.

EXAMPLE 1

A gold foil "Sample Daicho No. 56, produced by Murata Gold Foil K.K." which has the maximum specular glossiness at the incident angle of about 45° was employed as the base material. On this base material, an aqueous 10% solution of polyvinyl alcohol (trade name: PVA-217, produced by Kuraray Co., Ltd.) was applied by wire bar coating so as to obtain a dry thickness of 10 μm as the ink-receiving layer, and the obtained matter was dried at 120° C. for 3 minutes to prepare a recording medium of the present invention. On the resulting recording medium, printing was conducted by means of a color bubble jet printer (trade name: BJC-600, manufactured by Canon K.K.).

EXAMPLES 2 TO 12 AND COMPARATIVE EXAMPLES 1 TO 8

Recording mediums were prepared in the same manner as in Example 1 except for the conditions shown in Table 1.

The printed matters obtained in the above Examples and Comparative Examples were evaluated as below.

TABLE 1

| | Base material | Ink-receiving layer material |
|---|---|---|
| Example | | |
| 2 | Sample Daicho No. 03 (Murata Gold Foil K.K.) | Same as in Example 1 |
| 3 | Sample Daicho No. 75 (Murata Gold Foil K.K.) | Same as in Example 1 |
| 4 | Sample Daicho No. 101 (Murata Gold Foil K.K.) | Same as in Example 1 |
| 5 | Sample Daicho No. 109 (Murata Gold Foil K.K.) | Same as in Example 1 |
| 6 | 3D ILLUSION PAPER (AD STICKER) | Same as in Example 1 |
| 7 | Same as in Example 1 | Polyvinylacetal (KW-l. Sekisui Chem. Co.) |
| 8 | Same as in Example 1 | Hydroxyethylcellulose (A1–15, Fuji Chemical K.K.) |
| 9 | Same as in Example 1 | Cation-modified polyvinyl alcohol (CM-318, Kuraray Co.) |
| 10 | Bone-white colored PET film (Bone-White Lumirror 100E20 Toray Ind. Inc., 100 μm thick) | Mixture of 100 parts of Polyvinyl alcohol (PVA-217, Kuraray) and 10 parts of Rainblow Piece (No. 608G, Kurachi K.K.) |
| 11 | Coated paper (LC-201, Canon K.K.) | Same as in Example 10 |
| 12 | PPC paper (TY PE6000, Ricoh Co.) | Same as in Example 10 |
| Comparative Example | | |
| 1 | White PET film (100 μm thick, White Lumirror, Toray Ind.) | Same as in Example 1 |
| 2 | Same as in Example 10 | Same as in Example 1 |
| 3 | Same as in Example 1 | Polyethylene oxide (EP-15, Daiichi Kogyo Seiyaku K.K.) |
| 4 | Glossy paper (NS-101, Canon K.K.) | |
| 5 | Colored paper (BIO TOP COLOR, Itoya Dep. Paper K.K.) | |
| 6 | Same as in Example 10 | Mixture of 100 parts of polyvinyl alcohol (PVA-217, Kuraray) and 10 parts of silica particles (Silicia 470, Fuji Silicia Chemical K.K. average particle size 12 pm) |
| 7 | Same as in Example 11 | Same as in Comparative Example 6 |
| 8 | Same as in Example 12 | Same as in Comparative Example 6 |

[Items and Methods of Evaluation]

(1) Specular Glossiness at a Non-printed Area:

Using a digital angle variation glossimeter (UGV-5D, manufactured by Suga Tester K.K.) specular glossiness at a non-printed area of a recording medium was measured at measurement angles of 20°, 45°, 60°, and 75° according to JIS-Z-8741. The average value of five measured values was taken for the specular glossiness at each measurement angle.

The recording medium having the maximum specular glossiness at the angle other than 75° was evaluated to be "good", and the one having the maximum specular glossiness at 75° was evaluated to be "poor".

(2) Specular Glossiness at a Printed Area:

Similar to (1), specular glossinesses at solid printed areas of yellow, magenta and cyan colors were measured each at measuring angles of 20°, 45°, 60° and 75° according to JIS-Z-8741. The average values of each five measured values were taken for the specular glossiness at each measuring angles. The maximum specular glossiness and its measuring angle of each color are shown in Table 2.

(3) Decorativeness:

The decorativeness was evaluated of the non-printed area and of the printed area. The recording medium having higher decorativeness than PPC paper was evaluated to be "good", and the one having decorativeness not significantly improved was evaluated to be "poor".

Figure 5:
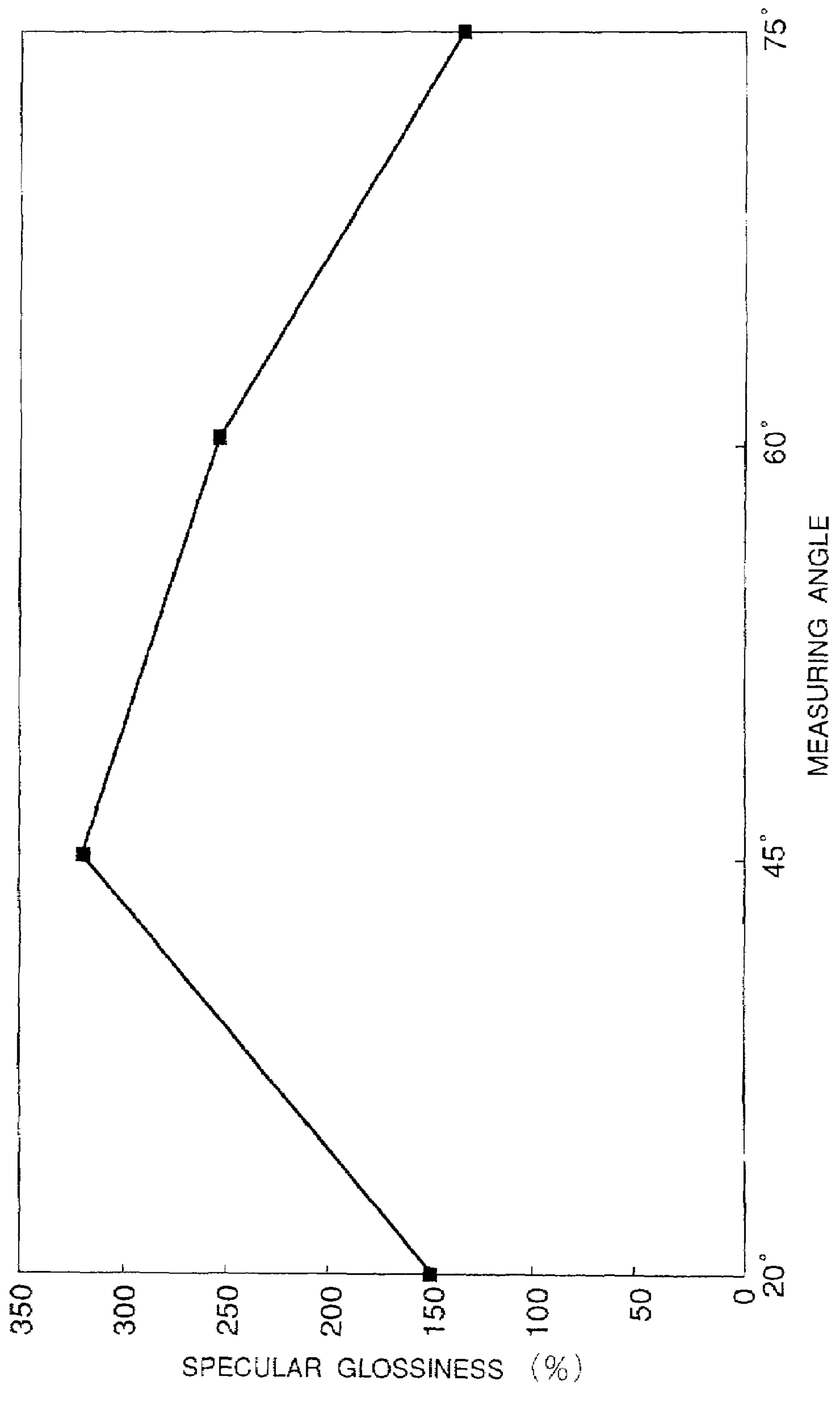
FIG. 5 is a conceptual graph showing dependence of the specular glossiness of a recording medium of the present invention on measurement angle.
Figure 6:
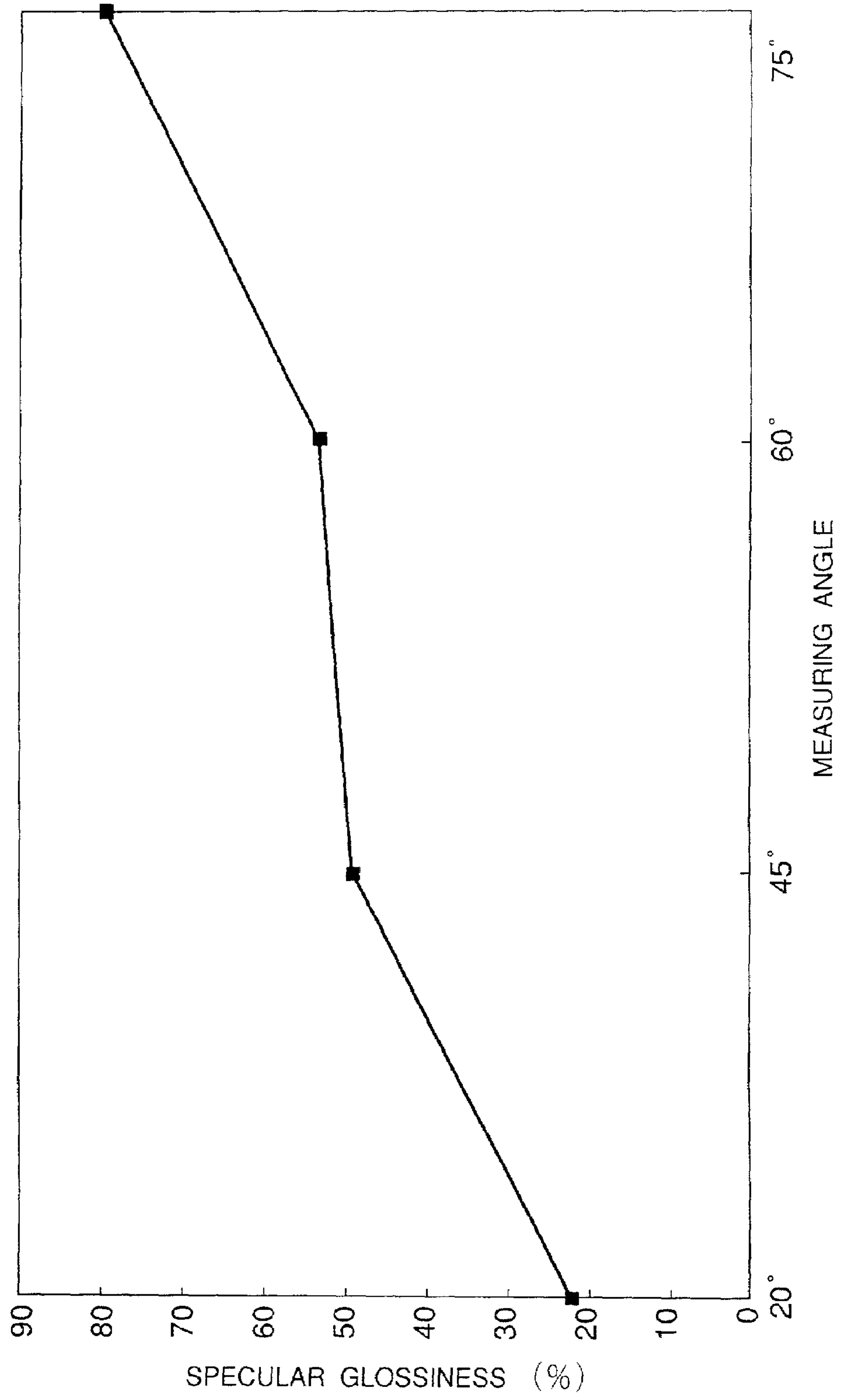
FIG. 6 is a conceptual graph showing dependence of the specular glossiness of a conventional recording medium on measurement angle.

FIG. 5 and FIG. 6 respectively show dependence of the specular glossiness of the recording medium of the present invention and that of a conventional one conceptually.

The results of the evaluation are shown in Table 2.

TABLE 2

| | Specular Glossiness at a non-printed area | | | | | Decorativeness | |
|---|---|---|---|---|---|---|---|
| | 20° | 45° | 60° | 75° | Evaluation | Non-printed area | Printed area |
| Example | | | | | | | |
| 1 | 54.8 | 172.2 | 135.4 | 117.5 | Good | Good | Good |
| 2 | 150.2 | >370 | 304.6 | 171.7 | Good | Good | Good |
| 3 | 170.3 | 356.8 | 289.9 | 180.5 | Good | Good | Good |
| 4 | 150.5 | 320.9 | 256.5 | 138.6 | Good | Good | Good |
| 5 | 120.7 | 333.5 | 275.6 | 171.4 | Good | Good | Good |
| 6 | 85.2 | 220.3 | 142.8 | 110.2 | Good | Good | Good |
| 7 | 55.6 | 174.5 | 132.5 | 117.3 | Good | Good | Good |
| 8 | 53.8 | 173.3 | 136.5 | 121.5 | Good | Good | Good |
| 9 | 54.1 | 170.3 | 128.5 | 121.5 | Good | Good | Good |
| 10 | 79.2 | 289.5 | 204.6 | 89.4 | Good | Good | Good |
| 11 | 44.2 | 172.3 | 123.1 | 78.6 | Good | Good | Good |
| 12 | 32.8 | 64.2 | 87.5 | 42.9 | Good | Good | Good |

TABLE 2-continued

| | | | | | | | |
|---|---|---|---|---|---|---|---|
| Comparative Example | | | | | | | |
| 1 | 76.6 | 88.1 | 91.7 | 99.6 | Poor | Poor | Poor |
| 2 | 4.9 | 31.8 | 39.6 | 67.2 | Poor | Poor | Poor |
| 3 | 42.6 | 54.6 | 70.4 | 78.6 | Poor | Poor | Poor |
| 4 | 22.1 | 49.4 | 53.8 | 80.3 | Poor | Poor | Poor |
| 5 | 0.4 | 3.2 | 3.4 | 6.1 | Poor | Poor | Poor |
| 6 | 74.5 | 85.3 | 90.8 | 96.6 | Poor | Poor | Poor |
| 7 | 3.4 | 6.5 | 10.3 | 19.2 | Poor | Poor | Poor |
| 8 | 0.7 | 3.6 | 5.6 | 10.4 | Poor | Poor | Poor |

| Ex- | Maximum specular glossiness at a printed area | | | | | |
|---|---|---|---|---|---|---|
| | Cyan | | Magenta | | Yellow | |
| ample No. | Specular glossiness | Angle (°) | Specular glossiness | Angle (°) | Specular glossiness | Angle (°) |
| Example | | | | | | |
| 1 | 153.3 | 45 | 147.2 | 45 | 162.4 | 45 |
| 2 | >370 | 45 | 356.2 | 45 | >370 | 45 |
| 3 | 305.8 | 45 | 312.2 | 45 | 333.4 | 45 |
| 4 | 286.5 | 45 | 278.4 | 45 | 311.7 | 45 |
| 5 | 308.5 | 45 | 302.1 | 60 | 300.8 | 60 |
| 6 | 189.6 | 45 | 180.0 | 45 | 204.2 | 45 |
| 7 | 162.7 | 45 | 152.9 | 45 | 161.0 | 45 |
| 8 | 145.6 | 45 | 152.8 | 45 | 158.4 | 45 |
| 9 | 150.0 | 45 | 144.4 | 45 | 158.9 | 45 |
| 10 | 260.2 | 45 | 256.3 | 45 | 270.1 | 45 |
| 11 | 145.6 | 45 | 150.8 | 45 | 157.6 | 45 |
| 12 | 78.9 | 60 | 77.7 | 45 | 80.2 | 60 |
| Comparative Example | | | | | | |
| 1 | 82.2 | 75 | 80.7 | 75 | 85.4 | 75 |
| 2 | 46.0 | 75 | 50.2 | 75 | 54.0 | 75 |
| 3 | 54.2 | 75 | 50.1 | 75 | 58.6 | 75 |
| 4 | 61.5 | 75 | 64.0 | 75 | 63.7 | 75 |
| 5 | 4.3 | 75 | 5.2 | 75 | 3.9 | 75 |
| 6 | 76.9 | 75 | 71.5 | 75 | 77.8 | 75 |
| 7 | 12.3 | 75 | 14.2 | 75 | 10.5 | 75 |
| 8 | 5.2 | 75 | 6.0 | 75 | 6.1 | 75 |

EXAMPLE 13

A gold foil "Sample Daicho 506, produced by Murata Gold Foil Co." which has the maximum specular glossiness at the incident angle of around 45° was employed as the base material. On this base material, an aqueous 10% solution of polyvinyl alcohol (trade name: PVA-217, produced by Kuraray Co., Ltd.) was applied by wire bar coating so as to obtain a dry thickness of 10 μm as the ink-receiving layer, and the obtained matter was dried at 120° C. for 3 minutes to prepare a recording medium of the present invention. On the resulting recording medium, solid printing was conducted for each of cyan, magenta, and yellow colors at a printing mode for an OHP sheet by means of a color bubble jet printer (trade name: BJC-600, manufactured by Canon K.K.) to obtain a printed matter of the present invention.

EXAMPLES 14 TO 26 AND COMPARATIVE EXAMPLES 9 TO 17

Printed matters were prepared in the same manner as in Example 13 except for the conditions shown in Table 3.

TABLE 3

| | Base material | Ink-receiving layer material |
|---|---|---|
| Example | | |
| 14 | Sample Daicho No. 84 (Murata Gold Foil K.K.) | Same as in Example 13 |
| 15 | Sample Daicho No. 103 (Murata Gold Foil K.K.) | Same as in Example 13 |
| 16 | Sample Daicho No. 117 (Murata Gold Foil K.K.) | Same as in Example 13 |
| 17 | Sample Daicho No. 155 (Murata Gold Foil K.K.) | Same as in Example 13 |
| 18 | Sample Daicho No. 204 (Murata Gold Foil K.K.) | Same as in Example 13 |
| 19 | Infinitone Film (Murata Gold Foil K.K.) | Same as in Example 13 |
| 20 | Aluminum vapor-deposited film (Metalumy, Toray Ind., 100 μm thick) | Same as in Example 13 |
| 21 | Same as in Example 13 | Polyvinylacetal (KW-l. Sekisui Chem. Co.) |
| 22 | Same as in Example 13 | Hydroxyethylcellulose (A1–15, Fuji Chemical K.K.) |
| 23 | Same as in Example 13 | Cation-modified polyvinyl alcohol (CM-318, Kuraray Co.) |
| 24 | White PET film (White Lumirror, Toray Ind. Inc., 100 μm thick) | Mixture of 100 parts of polyvinyl alcohol of Example 23 and 10 parts of copper powder |
| 25 | Glossy paper (NS-101, Canon K.K.) | Same as in Example 24 |
| 26 | PPC paper (#4024, Xerox Co.) | Same as in Example 24 |
| Comparative Example | | |
| 9 | Same as in Example 24 | Same as in Example 13 |
| 10 | Bone-white colored PET film (Bone-White Lumirror 100E20 Toray Ind. Inc., 100 μthick) | Same as in Example 13 |

TABLE 3-continued

| | Base material | Ink-receiving layer material |
|---|---|---|
| 11 | Glossy paper (NS-101, Canon K.K.) | |
| 12 | Colored paper (BIO TOP COLOR, Itoya Dep. Paper K.K.) | |
| 13 | PPC paper (#4024, Xerox Co.) | |
| 14 | Same as in Example 24 | Mixture of 100 parts of cation-modified polyvinyl alcohol (CM-318, Kuraray Co.) and 10 parts of fine silica particles (Silicia 470, Fuji Silicia Chemical K.K., average particle size: 12 μm) |
| 15 | Same as in Example 25 | Same as in Comparative Example 15 |
| 16 | Same as in Example 26 | Same as in Comparative Example 15 |

The printed matters obtained in the above Examples and Comparative Examples were evaluated as below.

[Items and Methods of Evaluation]

(1) Specular Glossiness:

Using a digital angle variation glossmeter (UGV-5D, manufactured by Suga Tester K.K.) specular glossiness at solid printed areas of each of yellow, magenta, and cyan colors was measured at measurement angles of 20°, 45°, 60°, and 75° according to JIS-Z-8741. The average value of the five measured values was taken for the specular glossiness at each measurement angle.

The recording medium having the maximum specular glossiness at the angle other than 75° for at least one of the yellow, magenta, and cyan colors was evaluated to be "good", and the one having the maximum specular glossiness at 75° for all of the three colors was evaluated to be "poor".

(2) Achievement Degree of Specular Glossiness:

The sample in which the maximum specular glossiness appeared at an angle other than 75° for each of the colors of yellow, magenta, and cyan, and the maximum values were not less than 100% was evaluated as "A". The sample in which the maximum specular glossiness appeared at an angle other than 75° for two of the three colors of yellow, magenta, and cyan, and the maximum values for the two colors were not less than 100% was evaluated as "B". The sample in which the maximum of the specular glossiness appeared at an angle other than 75° for one of the three colors of yellow, magenta, and cyan, and the maximum value for the one color was not less than 100% was evaluated as "C". The sample in which the maximum specular glossiness appeared at an angle other than 75° for one of the three colors of yellow, magenta, and cyan, and the maximum value for the one color was less than 100% was evaluated as "D". The sample in which the maximum specular glossiness appeared at 75° for all of the three colors was evaluated as "E".

(3) Decorativeness:

The recording medium having higher decorativeness than PPC paper was evaluated to be "good", and the one having decorativeness not significantly improved was evaluated to be "poor".

Figure 7:
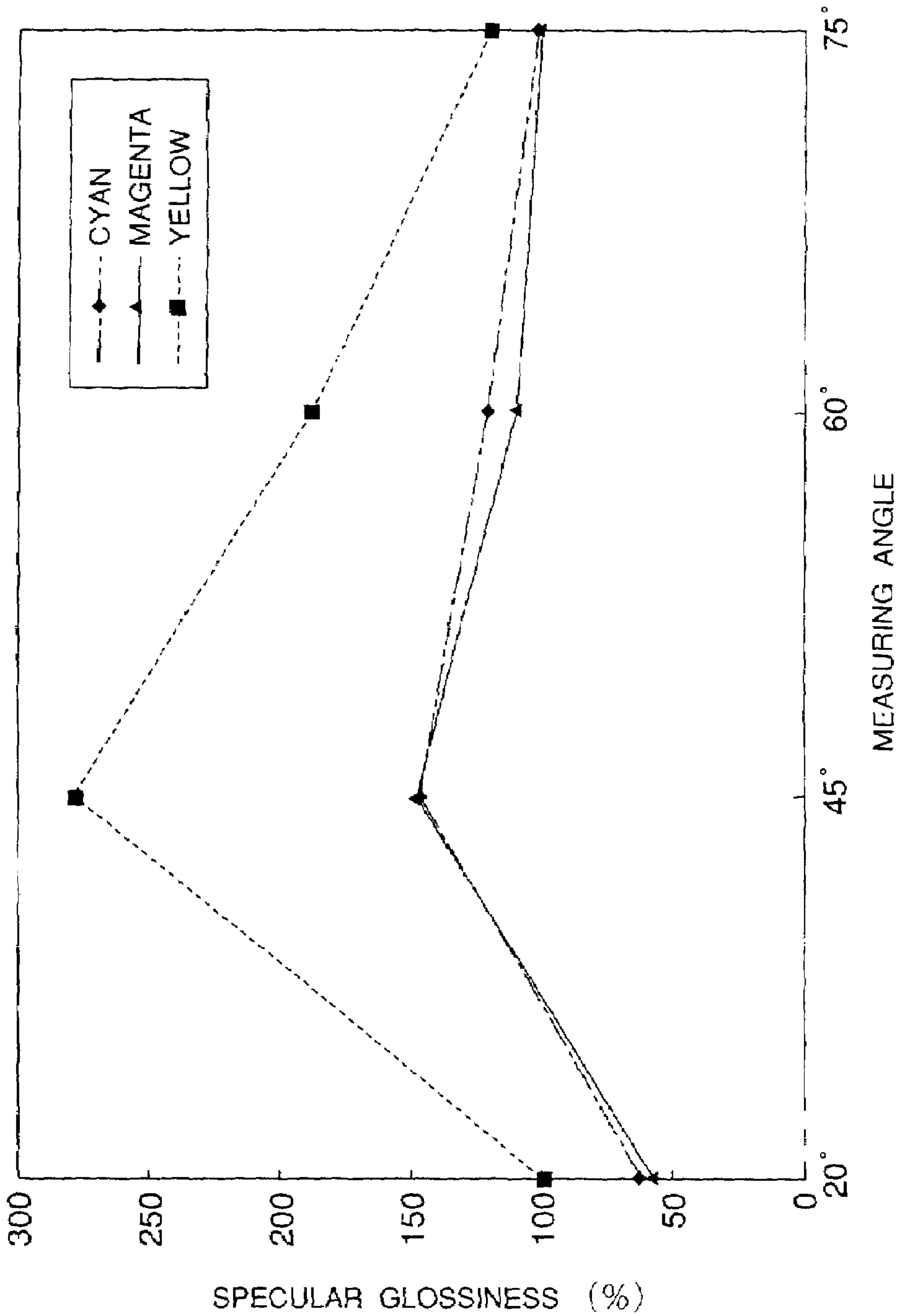
FIG. 7 is another conceptual graph showing dependence of the specular glossiness of a recording medium of the present invention on measurement angle.
Figure 8:
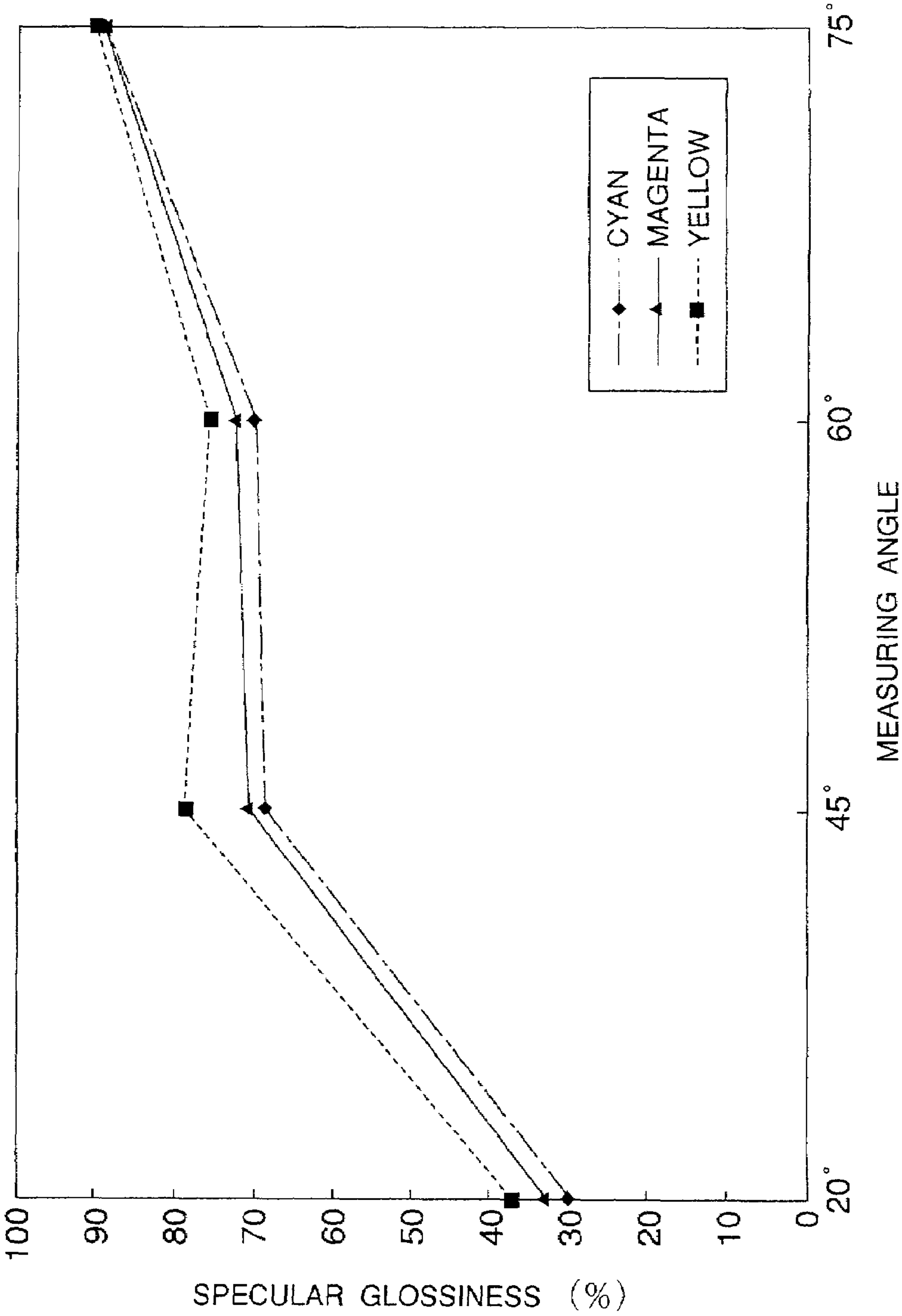
FIG. 8 is another conceptual graph showing dependence of the specular glossiness of a conventional recording medium on measurement angle.

FIG. 7 and FIG. 8 respectively show dependence of the specular glossiness of the printed matter of the present invention and that of a conventional one conceptually.

The results of the evaluation are shown in Table 4 and Table 5.

TABLE 4

| | Specular Glossiness of Printed Area | | | | | | | | | | | |
|---|---|---|---|---|---|---|---|---|---|---|---|---|
| | Cyan | | | | Magenta | | | | Yellow | | | |
| | 20° | 45° | 60° | 75° | 20° | 45° | 60° | 75° | 20° | 45° | 60° | 75° |
| Example | | | | | | | | | | | | |
| 13 | 39.4 | 90.8 | 89.4 | 102.5 | 34.8 | 84.8 | 86.4 | 94.0 | 40.5 | 118.2 | 107.0 | 97.1 |
| 14 | 42.5 | 98.4 | 80.3 | 78.4 | 40.5 | 93.3 | 87.9 | 80.3 | 38.3 | 109.8 | 98.6 | 90.3 |
| 15 | 154.5 | 209.8 | 180.6 | 130.6 | 136.7 | 208.5 | 150.2 | 100.7 | 278.9 | 333.4 | 264.4 | 167.4 |
| 16 | 60.9 | 146.7 | 120.9 | 102.2 | 56.7 | 149.0 | 109.8 | 100.7 | 100.0 | 277.8 | 187.7 | 120.2 |
| 17 | 40.6 | 87.6 | 92.7 | 100.7 | 40.7 | 87.7 | 84.2 | 98.8 | 45.7 | 129.2 | 102.9 | 92.1 |
| 18 | 229.1 | 293.8 | 183.4 | 119.2 | 151.7 | 203.8 | 149.5 | 109.7 | >370 | >370 | 354.9 | 171.1 |
| 19 | 54.2 | 88.8 | 86.0 | 89.9 | 52.8 | 82.6 | 85.5 | 88.9 | 60.0 | 93.2 | 90.3 | 89.4 |
| 20 | 347.4 | 352.8 | 199.0 | 112.3 | 215.8 | 237.1 | 150.7 | 103.3 | >370 | >370 | >370 | 179.2 |
| 21 | 42.5 | 98.3 | 90.8 | 99.2 | 35.7 | 88.8 | 82.2 | 92.2 | 50.9 | 130.2 | 111.9 | 98.2 |
| 22 | 33.4 | 89.9 | 82.2 | 98.3 | 30.3 | 89.3 | 81.1 | 92.9 | 46.4 | 122.4 | 108.8 | 99.1 |
| 23 | 46.4 | 109.2 | 91.1 | 96.2 | 42.3 | 92.2 | 82.4 | 96.2 | 52.6 | 143.3 | 121.1 | 108.8 |
| 24 | 87.6 | 96.2 | 80.8 | 75.4 | 79.8 | 105.3 | 89.9 | 76.3 | 81.5 | 143.7 | 112.3 | 88.4 |
| 25 | 43.4 | 78.3 | 70.4 | 66.3 | 44.5 | 88.1 | 80.0 | 67.7 | 50.4 | 102.3 | 89.9 | 77.4 |
| 26 | 24.5 | 44.3 | 56.4 | 47.6 | 22.2 | 36.5 | 50.3 | 60.3 | 19.9 | 56.4 | 50.4 | 44.8 |

TABLE 4-continued

| | Specular Glossiness of Printed Area | | | | | | | | | | | |
|---|---|---|---|---|---|---|---|---|---|---|---|---|
| | Cyan | | | | Magenta | | | | Yellow | | | |
| | 20° | 45° | 60° | 75° | 20° | 45° | 60° | 75° | 20° | 45° | 60° | 75° |
| Comparative Example | | | | | | | | | | | | |
| 9 | 60.3 | 87.1 | 89.2 | 97.6 | 61.9 | 83.3 | 87.0 | 94.8 | 56.1 | 84.1 | 86.2 | 94.0 |
| 10 | 40.1 | 82.8 | 76.5 | 96.8 | 43.8 | 79.2 | 83.3 | 94.5 | 38.4 | 79.6 | 82.2 | 94.4 |
| 11 | 10.9 | 38.7 | 43.4 | 69.2 | 12.8 | 40.6 | 48.8 | 78.3 | 12.8 | 40.9 | 48.5 | 74.4 |
| 12 | 0.4 | 3.6 | 4.0 | 4.2 | 1.0 | 3.0 | 3.6 | 4.0 | 1.3 | 2.2 | 2.8 | 4.0 |
| 13 | 0.2 | 2.8 | 3.2 | 3.3 | 0.8 | 1.8 | 2.2 | 3.5 | 1.2 | 2.1 | 2.7 | 3.7 |
| 14 | 31.4 | 70.2 | 72.2 | 86.2 | 30.5 | 67.7 | 71.1 | 81.2 | 34.0 | 69.6 | 75.5 | 89.5 |
| 15 | 12.2 | 40.1 | 48.3 | 71.3 | 15.2 | 43.6 | 47.3 | 75.6 | 14.3 | 36.8 | 47.8 | 76.3 |
| 16 | 3.6 | 7.3 | 10.3 | 12.1 | 3.0 | 6.3 | 9.4 | 11.1 | 4.6 | 8.3 | 12.8 | 16.3 |

TABLE 5

| | Specular glossiness | | Decorativeness |
|---|---|---|---|
| | Evaluation | Degree of achievement | of printed matter |
| Example | | | |
| 13 | Good | C | Good |
| 14 | Good | C | Good |
| 15 | Good | A | Good |
| 16 | Good | A | Good |
| 17 | Good | C | Good |
| 18 | Good | A | Good |
| 19 | Good | D | Good |
| 20 | Good | A | Good |
| 21 | Good | C | Good |
| 22 | Good | C | Good |
| 23 | Good | B | Good |
| 24 | Good | B | Good |
| 25 | Good | C | Good |
| 26 | Good | D | Good |
| Comparative Example | | | |
| 9 | Poor | E | Poor |
| 10 | Poor | E | Poor |
| 11 | Poor | E | Poor |
| 12 | Poor | E | Poor |
| 13 | Poor | E | Poor |
| 14 | Poor | E | Poor |
| 15 | Poor | E | Poor |
| 16 | Poor | E | Poor |

EXAMPLE 27

An aqueous 9% solution of a cation-modified polyvinyl alcohol (trade name: CM-318, produced by Kuraray Co., Ltd., saponification degree: about 89 mole percent, polymerization degree: about 1700, cation-modification degree: about 2 mole percent) was applied on an aluminum vapor-deposited film (trade name: Metalmee 100TS, produced by Toray Industries Inc., thickness 100 μm) on the face reverse to the aluminum deposition face so as to obtain the dry thickness of the coating of 10 μm, and the obtained matter was dried at 120° C. for 3 minutes to form an ink-receiving layer, thus completing a recording medium of the present invention.

On the recording medium, a color image was formed with the ink having the composition below by means of an ink-jet recording apparatus which ejects ink by bubbling of the ink by thermal energy under the recording conditions shown below.

| | |
|---|---|
| Ink Composition (Black): | |
| C.I. Direct Black 19 | 3 parts |
| Glycerin | 6 parts |
| Ethylene glycol | 5 parts |
| Urea | 5 parts |
| Isopropyl alcohol | 3 parts |
| Water | 78 parts |
| The surface tension of this ink was about 45 dyn/cm. | |
| Ink Composition (Yellow, Cyan, and Magenta): | |
| Dye | 4 parts |
| Glycerin | 7 parts |
| Thiodiglycol | 7 parts |
| Urea | 7 parts |
| Acetylene glycol | 1.5 parts |
| Water | 73.5 parts |
| Dyes: | |
| Yellow: | C.I. Direct Yellow 86 |
| Magenta: | C.I. Acid Red 23 |
| Cyan: | C.I. Direct Blue 199 |
| Recording Conditions: | |
| Ejection frequency: | 4 kHz |
| Volume of droplet: | 45 pl |
| Recording density: | 360 DPI |
| Maximum ink application of single color: | 8 nl/mm$^2$ |

EXAMPLE 28

A recording medium was prepared in the same manner as in Example 27 except that the aluminum vapor-deposited film was replaced by a commercial 15 μm-thick aluminum cooking foil on which a 75 μm-thick colorless transparent PET film had been laminated by hot-pressing at the glossier face side thereof. Thereon, a color image was formed by ink-jet recording in the same manner as in Example 27.

EXAMPLE 29

A recording medium was prepared in the same manner as in Example 27 except that the aluminum vapor-deposited film was replaced by a commercial 15 μm-thick aluminum cooking foil on which a 75 μm-thick yellow PET film had been laminated by hot pressing at the glossier face side thereof. Thereon, a color image was formed by ink-jet recording in the same manner as in Example 27.

EXAMPLE 30

A recording medium was prepared in the same manner as in Example 27 except that the aluminum vapor-deposited film was replaced by a commercial 15 μm-thick aluminum cooking foil on which a 75 μm-thick reddish brown PET film had been laminated by hot-pressing at the glossier face side thereof. Thereon, a color image was formed by ink-jet recording in the same manner as in Example 27.

EXAMPLE 31

A recording medium was prepared in the same manner as in Example 27 except that the aluminum vapor-deposited film was replaced by a commercial 30 μm-thick copper foil on which a 75 μm-thick colorless transparent PET film had been laminated by hot-melting at the glossier face side thereof. Thereon, a color image was formed by ink-jet recording in the same manner as in Example 27.

EXAMPLE 32

A recording medium was prepared in the same manner as in Example 27 except that the aluminum vapor-deposited film was replaced by a commercial 15 μm-thick aluminum cooking foil on which a 75 μm-thick colorless transparent PET film having a white flower pattern printed thereon had been laminated by hot-pressing at the glossier face side thereof. Thereon, a color image was formed by ink-jet recording in the same manner as in Example 27.

EXAMPLE 33

A recording medium was prepared in the same manner as in Example 27 except that the ink-receiving layer is formed by application of an aqueous solution of a mixture of 100 parts of a cation-modified polyvinyl alcohol (trade name: CM-318, produced by Kuraray Co., Ltd., saponification degree: about 89 mole percent, polymerization degree: about 1700, cation-modification degree: about 2 mole percent) and 20 parts in the terms of solid of an aqueous emulsion of an acrylate ester type copolymer (trade name: Movinyl 742N, produced by Hoechst Synthesis Co., solid content: 46%, MFT: 50° C.). Thereon, a color image was formed by ink-jet recording in the same manner as in Example 27.

EXAMPLE 34

A recording medium was prepared and a color image was formed in the same manner as in Example 27 except that the ink-receiving layer was formed from a polyvinyl acetal (trade name: KW-1, produced by Sekisui Chemical Co, Ltd.).

EXAMPLE 35

A recording medium was prepared and a color image was formed in the same manner as in Example 32 except that the ink-receiving layer was formed from a polyvinyl acetal (trade name: KW-1, produced by Sekisui Chemical Co, Ltd.).

EXAMPLE 36

A recording medium was prepared and a color image was formed in the same manner as in Example 27 except that the ink-receiving layer was formed from a polyvinyl alcohol (trade name: PVA-217, produced by Kuraray Co, Ltd.).

EXAMPLE 37

A recording medium was prepared and a color image was formed in the same manner as in Example 32 except that the ink-receiving layer was formed from a polyvinyl alcohol (trade name: PVA-217, produced by Kuraray Co, Ltd.).

EXAMPLE 38

A recording medium was prepared and a color image was formed in the same manner as in Example 27 except that the ink-receiving layer was formed from hydroxyethylcellulose (trade name: AL-15, produced by Fuji Chemical K.K.).

EXAMPLE 39

A recording medium was prepared and a color image was formed in the same manner as in Example 32 except that the ink-receiving layer was formed from hydroxyethylcellulose (trade name: AL-15, produced by Fuji Chemical K.K.).

EXAMPLE 40

A recording medium was prepared and color image was formed in the same manner as in Example 33 except that the surface of the hot press-bonded film was treated for oxidation.

[Evaluation Items]

(1) Metallic Luster:

The one having metallic luster is shown by the term "Lustered", and the one having no metallic luster is shown by the term "None" in Table 6.

(2) Kind of Metallic Luster:

The color of the metallic luster was observed.

(3) Metallic Luster Preservability-1:

Printing was conducted under room conditions, and the printed matter was stored at high temperature and high humidity environment of 45° C./95% for 4 weeks. Then the printed matter was evaluated for metallic luster preservability. The one exhibiting no change of the metallic luster was evaluated to be "good", the one exhibiting observable deterioration of the metallic luster was evaluated to be "fair", and the one having no metallic luster was evaluated to be "poor".

(4) Metallic Luster Preservability-2:

Printing was conducted under room conditions, and the printed matter was stored at high temperature and high humidity environment of 30° C./80% for 4 weeks. Then the printed matter was evaluated for metallic luster preservability. The one exhibiting no change of the metallic luster was evaluated to be "good", the one exhibiting observable deterioration of the metallic luster was evaluated to be "fair", and the one having no metallic luster was evaluated to be "poor".

(5) Ink Fixing Properties:

The printed matter prepared with black ink, and full dots of combinations of two colors of yellow, cyan, and magenta was left standing for 2 minutes after recording. Then the paper was superposed on the printed areas, and the superposed matter was rubbed at a pressure of 4 kg/cm$^2$. Then the paper was separated from the printed matter. The one which showed ink transfer to impair the printed image remarkably was evaluated to be "poor", the one which showed slight ink transfer to impair the printed image slightly was evaluated to be "fair", and the one which showed no ink transfer and no damage of the printed image was evaluated to be "good".

The evaluation results are shown collectively in Table 6.

TABLE 6

| Example No. | Cyan Specular glossiness | Cyan Angle (°) | Magenta Specular glossiness | Magenta Angle (°) | Yellow Specular glossiness | Yellow Angle (°) |
|---|---|---|---|---|---|---|
| | Maximum specular glossiness at a printed area | | | | | |
| 27 | >370 | 20 | 360.2 | 45 | >370 | 20 |
| 28 | 298.6 | 45 | 280.0 | 45 | 308.4 | 45 |
| 29 | 276.3 | 45 | 272.3 | 60 | 291.4 | 45 |
| 30 | 216.4 | 45 | 220.0 | 45 | 230.7 | 45 |
| 31 | 222.6 | 60 | 218.7 | 60 | 226.4 | 45 |
| 32 | 306.4 | 45 | 291.5 | 60 | 330.6 | 45 |
| 33 | 353.4 | 45 | 333.3 | 45 | >370 | 20 |
| 34 | >370 | 20 | 345.2 | 45 | >370 | 20 |
| 35 | 311.0 | 45 | 307.2 | 45 | 321.3 | 45 |
| 36 | >370 | 20 | 343.2 | 45 | >370 | 20 |
| 37 | 302.1 | 45 | 294.7 | 45 | 312.4 | 45 |
| 38 | 358.3 | 45 | 341.3 | 45 | >370 | 20 |
| 39 | 298.6 | 45 | 291.8 | 45 | 305.6 | 60 |
| 40 | 248.2 | 45 | 240.3 | 45 | 265.1 | 45 |

| Example No. | Metallic luster: Lustered or not | Metallic luster: Color | Metallic luster: Preservability-1 | Metallic luster: Preservability-2 | Ink fixing properties |
|---|---|---|---|---|---|
| 27 | Lustered | Silver | Good | Good | Fair |
| 28 | Lustered | Silver | Fair | Good | Fair |
| 29 | Lustered | Gold | Fair | Good | Fair |
| 30 | Lustered | Copper | Fair | Good | Fair |
| 31 | Lustered | Copper | Good | Good | Fair |
| 32 | Lustered | Silver | Fair | Good | Fair |
| 33 | Lustered | Silver | Fair | Good | Good |
| 34 | Lustered | Silver | Fair | Good | Good |
| 35 | Lustered | Silver | Fair | Good | Good |
| 36 | Lustered | Silver | Fair | Good | Good |
| 37 | Lustered | Silver | Fair | Good | Fair |
| 38 | Lustered | Silver | Fair | Good | Fair |
| 39 | Lustered | Silver | Fair | Good | Fair |
| 40 | Lustered | Silver | Good | Good | Good |

The ink-jet recording medium of the present invention gives high image quality which could not be achieved by conventional recording mediums. The ink-jet recording medium of the present invention exhibits higher glossiness when viewed from the front thereof unlike conventional glossy recording medium, thereby giving high decorativeness, and enables dynamic color representation.

The recording medium of the present invention gives desirable printed matter without much labor, unlike conventional recording medium. The printed matter of the present invention gives high image quality which could not be achieved by conventional recording mediums. Further, the printed matter of the present invention exhibits higher glossiness when viewed from the front thereof unlike conventional glossy recording medium, thereby giving high decorativeness, and enables dynamic color representation.

The present invention gives also an ink-jet recording medium having metallic luster which is retained perpetually even under severe conditions of high temperature and high humidity.

What is claimed is:

1. A printed matter printed with ink dots comprising at least one of solid printed areas of yellow, magenta, and cyan colors, said printed matter comprising a transparent and ink-intercepting base material, said base material having a first face and a second face, a metal layer formed on the first face of the base material, and a transparent ink-receiving layer provided on the second face of the base material, wherein the surface of the ink-receiving layer constitutes an outer surface of the printed matter, wherein the first face of the transparent base material on the metal layer side is embossed, and wherein said at least one of solid printed areas of yellow, magenta, and cyan colors has maximum specular glossiness within a measurement angle range of from 20° to 60° when measuring with an angle range of from 20° to 75°.

2. The printed matter according to claim 1, wherein at least one of solid printed areas of yellow, magenta, and cyan colors exhibits a maximum specular glossiness value of 100% or more within a measurement angle range of from 20° to 60°.

3. The printed matter according to claim 2, wherein each of the solid printed areas of yellow, magenta, and cyan colors exhibits respectively a maximum specular glossiness of 100% or more within a measurement angle range of from 20° to 60°.

4. The printed matter according to claim 1, wherein at least one of solid printed areas of yellow, magenta, and cyan colors exhibits specular glossiness values of 100% or more throughout the measurement angle range of from 20° to 75°.

5. The printed matter according to claim 1, wherein each of the solid printed areas of yellow, magenta, and cyan colors exhibits maximum specular glossiness within a measurement angle range of from 20° to 60°.

6. The printed matter according to claim 5, wherein each of the solid printed areas of yellow, magenta, and cyan colors exhibits respectively a specular glossiness of 100% or more within a measurement angle range of from 20° to 75°.

7. The printed matter according to claim 1, wherein the base material is a plastic film.

8. The printed matter according to claim 1, wherein a releasable adhesive layer is provided on the first face of the base material on the metal layer side.

9. The printed matter according to claim 1, wherein solid printing was conducted for each of cyan, magenta, and yellow colors.

10. The printed matter according to claim 1, wherein the ink-receiving layer comprises a water-soluble resin selected from the group consisting of polyvinyl alcohol, cation-modified polyvinyl alcohol, acetal-modified polyvinyl alcohol, hydroxyethylcellulose and polyvinyl pyrrolidone.

* * * * *